2,888,440
POLYURETHANE DIAMINES

August H. Frazer and Earl J. Goldberg, Wilmington, Del., assignors to E. I. du Pont de Nemours and Company, Wilmington, Del., a corporation of Delaware No Drawing. Application August 16, 1957
Serial No. 678,529

5 Claims. (Cl. 260—77.5)

This invention relates to novel polyurethane polymers and more particularly to polyurethane secondary diamines of controlled molecular weight and to a process for their preparation.

Heretofore one of the methods available for the preparation of polyurethane polymers has been an interphase polymerization of a bischloroformate with an organic diamine. This method of preparation is completely unsatisfactory for preparing a polyurethane diamine of relatively low molecular weight since when using an interphase method it is not possible to control the degree of polymerization. Thus, in U.S. Patent 2,660,574, the preparation of polyurethanes by the reaction of bischloroformates with diamines is disclosed; however, it is stated that the molecular weight ratio of the reactants has no effect upon the molecular weight of the polymers obtained and that an excess of either the bischloroformate or diamine reactant does not act to limit chain length. The prior art method can be considered an interphase polymerization in that the bischloroformate is dissolved in an organic solvent and the amine is dissolved or suspended in water with an acid acceptor. The polymerization occurs mainly at the interface between the water and the organic phase. The relative saturation concentration of the reactants at the interface, rather than their overall relative concentration, will determine the degree of polymerization. It would be highly desirable to be able to prepare polyurethane diamines, more particularly polyurethane secondary diamines of controlled, relatively low molecular weight which could be used as intermediates in the formation of thermally stable elastomers or as hardening agents for epoxy resins.

It is an object of the present invention to provide novel polyurethane diamines of relatively low, yet controlled molecular weight. A further object is to provide novel polyurethane secondary diamines of controlled molecular weight which are highly useful as elastomer intermediates. A still further object is to provide a process for the preparation of these polyurethane secondary diamines. Other objects will appear hereinafter.

These and other objects of the present invention are accomplished by providing polyurethane diamines having a molecular weight of from about 990 to about 6000 and having the formula

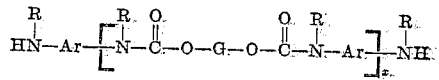

wherein O—G—O is a bivalent radical obtained by removing the terminal hydrogen atoms from a polymeric diol having a molecular weight of from about 666 to 5670 and being selected from the group consisting of polyalkyleneether glycols, polyalkylene-aryleneether glycols, and hydroxyl-terminated aliphatic hydrocarbon polymers; Ar is a bivalent arylene radical which may contain substituents selected from the group consisting of alkyl radicals, alkoxy radicals, aryloxy radicals, and halogen radicals; R is a lower alkyl radical; and $x$ is an integer greater than zero.

These polyurethane diamines are prepared by a monophase polymerization involving a bischloroformate and an arylene secondary diamine under carefully controlled conditions. These conditions involve the use of an organic solvent which is inert to phosgene, the use of particular acid acceptors, and controlled temperature. Thus, a solution of the bischloroformate of the polymeric diol in an organic solvent which is inert to phosgene is added to a solution of an arylene secondary diamine in an organic solvent which is inert to phosgene and which contains a suspension of an insoluble acid acceptor. The reaction mixture is filtered and the filtrate is concentrated under vacuum to yield the polyurethane diamine. It is only by means of this process that the molar ratios of bischloroformate to diamine can be varied so as to provide a polyurethane diamine of desired molecular weight.

As mentioned above, organic solvents inert to phosgene must be used in the process of this invention. Representative solvents include benzene (which is preferred), xylene, toluene, tetrahydrofuran and ortho-dichlorobenzene. It is to be understood that the solvent which is used for the bischloroformate need not necessarily be the same as the solvent which is used for the diamine and that mixtures of solvents may be used. It is to be understood that these solvents must be miscible in each other and they must be able to keep the arylene diamine, the bischloroformate, and the polyurethane diamine product in solution during the reaction. The concentrations employed are critical only to the extent that everything except the acid acceptor must be in solution. Convenience of agitation, however, may dictate a practical concentration limit below that imposed by solubility considerations alone. The product may be quite viscous. In general, concentrations ranging from about 10 to 20% by weight of solvent are suitable.

The acid acceptor which is used in the polymerization process of the present invention ties up the hydrochloride which is formed by the reaction of the bischloroformate with the diamine. This acceptor must be a Group IA or IIA oxide, hydroxide, or carbonate which is insoluble in the organic solvent used. Representative compounds include calcium oxide, magnesium oxide, strontium oxide, sodium hydroxide, potassium hydroxide, calcium hydroxide, barium hydroxide, and sodium carbonate. There should be sufficient acceptor present to neutralize all the hydrogen chloride liberated during the reaction. In general, the ratio of the number of equivalents of base provided to the number of equivalents of acid liberated is at least 2:1 and may be greater, if desired.

The reaction between the bischloroformate and the diamine may be conducted at temperatures ranging from about 15° to 50° C. In general, room temperature is preferred. At a temperature below about 15° C. the reaction proceeds too slowly; also, operating problems arise as the solubility of the components decreases. At temperatures above 50° C. the bischloroformates may exhibit a tendency toward thermal instability. Heat is evolved during the reaction. If the bischloroformate solution is introduced into the arylene diamine solution over about 1½ to 2 hour period, the temperature rise encountered will generally not necessitate application of external cooling.

The time required for complete reaction will vary inversely with the operating temperature. In general after the reactants have been mixed, it is sufficient to stir them at room temperature for about 16 hours. The progress of the reaction may be followed by removing aliquot samples, filtering out the insoluble acid binder, and analyzing the filtrate for equivalents of amine.

The bischloroformates which are used to prepare the polyurethane diamines of the present invention are obtained by reacting phosgene with a polymeric diol. This may be accomplished by slowly adding the appropriate polymeric diol to liquid phosgene at about 0° to 10° C. or, alternatively, the phosgene may be added to the polymeric diol which is dissolved in an inert solvent. For purposes of the present invention, the bischloroformates obtained should have molecular weights of from about 790 to 5800.

Representative polymeric diols which may be used to prepare these bischloroformates are polyalkyleneether glycols, polyalkylene-aryleneether glycols, and hydroxyl-terminated aliphatic hydrocarbon polymers. Mixtures of two or more different diols may be used.

The polyalkyleneether glycols may be represented by the formula $HO(RO)_nH$ where R is an alkylene radical containing up to 10 carbon atoms and $n$ is an integer sufficiently large that the molecular weight of the polyalkyleneether glycol is at least 666 and may range as high as 5670. Some examples of these glycols are polyethyleneether glycol, polypropyleneether glycol, polyhexyleneether glycol, polytrimethyleneether glycol, polytetramethyleneether glycol, polypentamethyleneether glycol, polydecamethyleneether glycol, poly - 1,2 - dimethyl ethyleneether glycol, and the copolymer of tetrahydrofuran and 1 - allyloxy - 2,3 - epoxy - propane. The alkyleneether glycols are made by the polymerization of cyclic ethers such as alkylene oxides or dioxolane or by the condensation of the glycols. The preferred polyalkyleneether glycol is polytetramethyleneether glycol (also known as poly-n-butyleneether glycol) which is prepared by the acid-catalyst polymerization of tetrahydrofuran.

Another class of glycols are the polyalkylenearyleneether glycols. These glycols are similar to the polyalkyleneether glycols except that some arylene radicals are present. The phenylene, naphthylene, and anthracene radicals may be used with or without substituents such as alkyl or alkylene groups, and, in general, there should be at least one polyalkyleneether radical having a molecular weight of about 500 for each arylene radical which is present.

The polyaliphatic hydrocarbon diols may be prepared by polymerizing appropriate polymerizable ethylenically unsaturated monomers, at least 50% of which are conjugated dienes. A convenient source of free radicals for making the above polyaliphatic hydrocarbon diols by polymerization are the aliphatic azo dicarboxylates in which the carbons attached to the azo group are tertiary, having the general formula

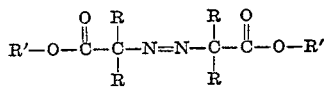

When heated, these compounds yield nitrogen and free radicals corresponding to the groups originally attached to the azo group. The free radicals generated attack the polymerizable monomer present and initiate its polymerization. The desired polymer molecular weight may be obtained by a proper choice of the molar ratio of monomer to azo compound, the higher ratios giving the longer chains. When the dicarboxylate-terminated polymer is reacted with lithium aluminum hydride, the carboxyl groups are converted to hydroxyl groups. The polyaliphatic hydrocarbon diols which are saturated in their aliphatic portion are prepared by catalytic reduction of the corresponding unsaturated polyaliphatic hydrocarbon diols over Raney nickel.

Any of a wide variety of secondary arylene diamines are useful in preparing the polyurethane diamines of this invention. Representative compounds include 2,4-bis(N-methylamino) toluene, 4,4′-bis(N-methylamino)diphenylmethane, 4,4′-bis(N - methylamino) - 3,3′ - dimethoxy - diphenylmethane, 4,4′ - bis(N - ethylamino) - diphenyl, 4,4′ - bis(N - methylamino) - 3,3′ - dimethoxydiphenyl, 9,10 - bis(N - methylamino)anthracene, N,N′ - dimethyl - m - phenylenediamine, N,N′ - diethyl - m - phenylenediamine, 4 - methoxy - N,N′ - diisobutyl - m - phenylenediamine, 2 - methoxy - N,N′ - diisobutyl - m - phenylenediamine, 4 - chloro - N,N′ - di - n - propyl - m - phenylenediamine, 2 - chloro - N,N′ - diisobutyl - m - phenylenediamine, 4 - bromo - N,N′ - diethyl - m - phenylenediamine, 4 - ethoxy - N,N′ - diisobutyl - m - phenylenediamine, 2 - ethoxy - N,N′ - diisobutyl - m - phenylenediamine, 4 - phenoxy - N,N′ - diisobutyl - m - phenylenediamine, 2,4′ - bis(N - ethylamino)diphenylether, 4,4′ - bis(N - isobutylamino)diphenylether, 4 - isopropyl - N,N′-diisobutyl - m - phenylenediamine, 2 - isopropyl - N,N′ - diethyl - m - phenylenediamine, 5,6 - dimethyl - N,N′ - diethyl - m - phenylenediamine, 2,3 - dimethyl - N,N′ - diisobutyl - p - phenylenediamine, 2,4-dimethyl - N,N′ - diethyl - m - phenylenediamine, 4,6 - dimethyl - N,N′ - diethyl - m - phenylenediamine, 3,6 - dimethyl - N,N′ - diisobutyl - p - phenylenediamine, 1,4 - bis(N - ethylamino) - anthracene, 9,10 - bis(N - ethylamino)anthracene, 2,2′ - bis(N - ethylamino)dibenzyl, 4,4′ - bis - (N - ethylamino)dibenzyl, 4,4′ - bis(N - methylamino) - diphenyl, 1,5 - bis(N - isobutylamino)naphthalene, 2,4 - bis(N - ethylamino)fluorene, 1,4 - bis(N - ethylamino) - naphthalene, 1,8 - bis(N - n - propylamino)naphthalene, 2,6 - bis(N - ethylamino)naphthalene, and N,N′ - di - ethylbenzidine. These amines may be prepared by the reductive alkylation of the corresponding arylene dinitro compounds with the appropriate aldehydes or ketones.

The novel polyurethane diamines of the present invention have a wide variety of uses. They can be employed as hardening agents for epoxy resins. In addition, they may be used as intermediates in the formation of highly useful stable elastomers by a chain extension of the diamine with a compound such as a non-polymeric bischloroformate. Elastomers prepared by using these polyurethane diamines as intermediates have a wide variety of uses, such as in tires, inner tubes, belts, coated fabrics, etc. They are characterized by having excellent thermal stability properties and excellent resistance to sunlight, oxygen, ozone and hydrocarbon solvents. In addition, these elastomers display outstanding resistance to mechanical abrasion.

The following examples will better illustrate the nature of the present invention; however, the invention is not intended to be limited to these examples. Parts are by weight unless otherwise indicated.

In the examples the following ASTM procedures are employed for the tests carried out:

Tensile strength _____ D 638–52T
Yerzley resilience _____ D 945–55

The smear point value is the temperature at which a trail of molten polymer is left on a copper block when a sample is drawn slowly over the sulfate while pushing it against the block firmly by hand.

EXAMPLE 1

50 parts of finely-divided calcium hydroxide is suspended in an agitated solution composed of 13.56 parts of 4,4′-bis(N-methylamino)diphenylmethane in 320 parts of anhydrous benzene at room temperature. A solution of 44.4 parts of polytetramethyleneether-bischoloroformate (having a molecular weight of 1100) in 160 parts of anhydrous benzene is added dropwise at room temperature over a 2-hour period to the above suspension. Thereafter, agitation is continued for 16 hours at room temperature. The mixture is then filtered through diatomaceous earth. The benzene is removed at reduced pressure from the filtrate to yield the viscous polyurethane diamine. Perchloric acid titration for amine end groups gives 0.712 meq./g. which corresponds to a molecular weight of 2790.

EXAMPLE 2

150 parts of finely-divided calcium hydroxide is suspended in an agitated solution composed of 30 parts of 2,4-bis(N-methylamino)toluene in 800 parts of anhydrous benzene at room temperature. A solution of 148 parts of polytetramethyleneether-bischloroformate of molecular weight 1110 in 400 parts of anhydrous benzene is added dropwise at room temperature over a 2-hour period to the above suspension. Thereafter, agitation is continued for 16 hours at room temperature. The mixture is then filtered through diatomaceous earth. The benzene is removed at reduced pressure from the filtrate to yield the viscous polyurethane diamine. Perchloric acid titration for amine end groups gives 0.85 meq./g. which corresponds to a molecular weight of 2353.

EXAMPLE 3

175 parts of finely-divided calcium hydroxide is suspended in an agitated solution composed of 67.9 parts of 4,4'-bis(N - methylamino)diphenylmethane in 1200 parts of anhydrous benzene at room temperature. A solution of 170.3 parts of polytetramethyleneether-bis-chloroformate of molecular weight 1135 in 500 parts of anhydrous benzene is added dropwise at room temperature with stirring over a 1½ hour period. The mixture is agitated for 16 hours at room temperature, filtered through diatomaceous earth and concentrated at reduced pressure. A viscous oil is obtained and the polymer has a molecular weight of 1514.

EXAMPLE 4

A. Preparation of the polyurethane diamine 13.56 parts of 4,4'-bis(N-methylamino)diphenylmethane is dissolved in 350 parts of benzene. 50 parts of finely-divided calcium hydroxide is added. The mixture is stirred at room temperature and a solution of 44.4 parts of a polytetramethyleneether-bischloroformate of molecular weight 1070, in 175 parts of benzene, is added over a period of 2 hours. The mixture is then stirred for 16 hours and filtered. The benzene is removed from the filtrate by gradually raising the temperature to 100° C. and reducing the pressure to 1 mm. The polyurethane diamine obtained has a molecular weight of 2752 as determined by titration for aromatic amine end groups.

B. Chain extension of the polyurethane diamine to an elastomer 27.5 parts of this polyurethane diamine is dissolved in 110 parts of benzene. To the solution is added simultaneously 2.85 parts of 2[(allyloxy)methyl]-2-methyl-1,3-propane bischloroformate and a solution of 2.5 parts of sodium carbonate in 125 parts of water. The resulting mixture is stirred vigorously for 25 minutes. 0.3 part of phenyl-β-naphthylamine is added and the mass is poured into 1000 parts of water. The mass is boiled 20 minutes, the water is changed, and the mass is boiled for 20 minutes longer. The polymer is collected and washed on a rubber wash mill with water at 40–50° C. for 10 minutes. It is then transferred to a rubber mill and dried by milling for 10 minutes at 110–120° C. This polymer has an average molecular weight of 2964 per side chain curing site.

C. Curing of the elastomer 100 parts of the polymer, 30 parts of high abrasion furnace black, 3 parts of sulfur, and 6 parts of 2,2'-dithiobisbenzothiazole are compounded on a rubber mill for 10 minutes at 50–60° C. The compounded stock is cured in molds in a press for 3 hours at 140° C. The resulting elastomer has the following properties:

Tensile strength at break, 25° C. _____p.s.i__ 2850
Modulus at 300% elongation, 25° C. _____p.s.i__ 2050
Elongation at break, 25° C. _____percent__ 370
Yerzley resilience, 25° C. _____do____ 74
Smear point _____°C__ 365

EXAMPLE 8

A. Preparation of the polyurethane diamine 11.1 parts of 4-allyloxy-N,N'-dimethyl-m-phenylenediamine prepared by the lithium aluminum hydride reduction of 4-allyloxy-m-phenylene diisocyanate in a known manner, is dissolved in 200 parts of benzene. Then 5.5 parts of finely-divided calcium hydroxide is suspended in this solution. To this mixture is added over an hour period at room temperature, with stirring, 154 parts of a benzene solution of a polytetramethyleneether bischloroformate, prepared from a polytetramethyleneether glycol of molecular weight 2990. Stirring is continued for 2 hours. The mixture is then filtered.

B. Conversion of part of the polyurethane diamine to the bis carbamyl chloride 150 parts of this filtrate prepared in A above is dissolved in 50 parts of benzene. Phosgene is bubbled into the solution at room temperature for 1 hour. The solution is then heated slowly to reflux over a 30-minute period while the introduction of phosgene bubbles is continued. Phosgene is passed through the refluxing solution for an additional 30 minutes. The solution is refluxed for 3 more hours. Nitrogen is then blown through the solution until the exit gas is free of phosgene and hydrogen chloride.

C. Chain extension of the polyurethane diamine to an elastomer

To the solution prepared in B above is added at room temperature 150 parts of the filtrate from A above. 2.5 parts of finely-divided calucium hydroxide and 50 parts of anhydrous benzene are added. The mixture is stirred at reflux for 3 days, cooled to room temperature and diluted with 500 parts of tetrahydrofuran. The mixture is then centrifuged and the calcium salts separated. 0.2 part of phenyl-β-naphthylamine is added and the solvent is allowed to evaporate. The resulting polymer is milled on a rubber mill for 10 minutes at 100° C. This polymer has an average molecular weight of 1727 per side chain curing site.

D. Curing of the elastomer 100 parts of the polymer, 30 parts of high abrasion furnace black, 1 part of sulfur, 3 parts of 2,2'-dithiobisbenzothiazole, 1 part of 2-mercaptobenzothiazole and 0.2 part of zinc chloride are compounded on a rubber mill for 10 minutes at 25–30° C. The compounded stock is cured in molds in a press for 1 hour at 140° C. The resulting vulcanizate is a resilient elastomer having good stress-strain properties and a smear point above 330° C.

As many widely different embodiments of this invention may be made without departing from the spirit and scope thereof, it is to be understood that this invention is not limited to the specific embodiments thereof except as defined in the appended claims.

What is claimed is:

1. A polyurethane diamine having a molecular weight of from about 990 to about 6000 and having the formula

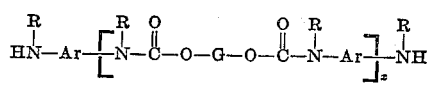

wherein O—G—O is a bivalent radical obtained by removing the terminal hydrogen atoms from a polymeric diol having a molecular weight of from about 666 to 5670 and being selected from the group consisting of polyalkyleneether glycols, polyalkylene-aryleneether glycols, and hydroxyl-terminated aliphatic hydrocarbon polymers; Ar is a bivalent radical selected from the group consisting of an arylene radical, an alkyl substituted arylene radical, an alkoxy substituted arylene radical, an aryloxy substituted arylene radical and a halogen substituted arylene radical; R is a lower alkyl radical; and $x$ is an integer greater than zero.

2. A diamine according to claim 1 wherein O—G—O is obtained by removing the terminal hydrogen atoms from a polyalkyleneether glycol.

3. A diamine according to claim 2 wherein the polyalkyleneether glycol is a polytetramethyleneether glycol.

4. A diamine according to claim 3 wherein Ar is a phenylene radical and R is a methyl radical.

5. A diamine according to claim 3 wherein Ar is a bivalent radical having the formula

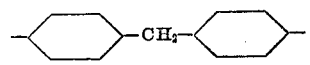

and R is a methyl radical.

References Cited in the file of this patent

UNITED STATES PATENTS

| | | |
|---|---|---|
| 2,660,574 | Jones et al. | Nov. 24, 1953 |
| 2,757,191 | Stilmar | July 31, 1956 |
| 2,835,654 | Carter et al. | May 20, 1958 |
| 2,843,569 | Benning et al. | July 15, 1958 |

UNITED STATES PATENT OFFICE

CERTIFICATE OF CORRECTION

Patent No. 2,888,440  May 26, 1959

August H. Frazer et al

It is hereby certified that error appears in the printed specification of the above numbered patent requiring correction and that the said Letters Patent should read as corrected below.

Column 3, line 26, for "alkyleneether" read -- alkylene --; same line 26, before "glycols" insert -- groups need not be all the same. These polyalkyleneether --; line 31, for "acid-catalyst" read -- acid-catalyzed --; column 4, line 56, for "sulfate" read -- surface --; column 5, line 53, for "25 minutes" read -- 20 minutes --; column 6, line 37, for "calucium" read -- calcium --.

Signed and sealed this 6th day of October 1959.

(SEAL)
Attest:

KARL H. AXLINE  
Attesting Officer

ROBERT C. WATSON  
Commissioner of Patents